United States Patent [19]

Papenfuss et al.

[11] 3,751,279

[45] Aug. 7, 1973

[54] PIGMENT COMPOSITIONS AND PROCESS FOR PREPARING THEM

[75] Inventors: Theodor Papenfuss; Rolf Rehberg, both of Niederhofheim, Taunus; Ernst Spietschka, Oberauroff, all of Germany

[73] Assignee: Farbwerke Hoechst Aktiengesellschaft vormals Meister Lucius & Brunning, Frankfurt/Main, Germany

[22] Filed: Apr. 15, 1971

[21] Appl. No.: 134,473

[30] Foreign Application Priority Data

Apr. 16, 1970 Germany............... P 20 18 168.4

[52] U.S. Cl. .......................... 106/288 Q, 106/309
[51] Int. Cl. ..................... C07d 7/42, C09b 67/00
[58] Field of Search ............... 106/288 Q, 308 M, 106/308 F, 308 Q, 309, 241

[56] References Cited
UNITED STATES PATENTS 3,216,948  11/1965  Redding.......................... 106/288 Q
3,296,001  1/1967  Ambler et al.................. 106/308 Q
3,583,877  6/1971  Rosenblum et al................. 106/309

*Primary Examiner*—Delbert E. Gantz
*Assistant Examiner*—S. Berger
*Attorney*—Curtis, Morris & Safford

[57]  ABSTRACT

Pigment compositions of resins and xanthene dyestuffs, which are prepared by dissolving the dyestuff salt with the addition of alkali in an organic solvent miscible with water or in an organic amine, dissolving in this solution such a resin which can be precipitated again by addition of an acid, or adding such a solution of such a resin in one of the said solvents, mixing the mixture thus obtained with an aqueous acid and recovering the pigment composition precipitated. The pigment compositions according to the invention are distinguished by an extraordinary good brilliance of the prints produced therewith. They are extremely easy to disperse in printing varnishes and therefore especially valuable in use.

5 Claims, No Drawings

PIGMENT COMPOSITIONS AND PROCESS FOR PREPARING THEM

The present invention provides brilliant red and violet pigment compositions of high tinctorial strength and a process for preparing them.

For the production of red and violet printing inks in most cases brilliant triphenyl-methane dyestuffs and azo dyestuffs are used since these offer, in addition to their excellent tinctorial strength, an appreciable price advantage over faster pigments. Since paper printing does not require extreme fastness, such compounds, for example water-soluble rhodamine- or triphenyl-methane dyestuffs precipitated with phosphorus-tungstic acid, phosphorus-molybdenic acid or mixtures of these acids, ferro- or ferricyanides, on the one hand, and laked azo dyestuffs of the β-naphthol series, on the other hand, may advantageously be used for these applications.

In spite of these advantages, the said dyestuffs have no optimal properties. Especially in newspaper printing inks, their purity and brilliance are not sufficient since the grey and coarse-fibred paper brings about an appreciable dulling of the printed dyestuffs. Moreover, in many cases, the said printing pigments have too hard a grain to be processed in stream-lined apparatuses having a high through-put (for example dissolver and attritor). It is therefore necessary to use strong shearing forces (for example three-roller mill, ball mill, kneader) for the dispersion (breaking up of the aggregates and agglomerates to yield the primary grain), which has an adverse effect on the optimum production of printing inks owing to the low through-put of these machines.

The present invention now provides novel and especially brilliant red and violet pigment compositions which have a very high tinctorial strength and avoid the above-mentioned disadvantages, which compositions are made from resins and xanthene dyestuff salts of the general formula

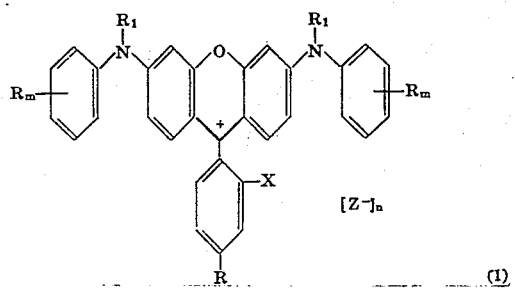

(1)

in 0 R stands for a hydrogen, a halogen atom, an alkyl or alkoxy group preferably having one to four carbon atoms, a nitro, cyano, carboxylic acid ester, carbonamido, alkylsulfonyl, acylamino, sulfamido, amino, alkylamino, phenylamino and/or optionally substituted phenyl group - two radicals R in ortho position may together stand also for a condensed phenyl nucleus or may be a constituent of a heterocyclic system -, $R_1$ stands for a hydrogen atom, a methyl and/or ethyl group, $m$ is 0 or an integer of 1 to 3, X stands for a hydrogen or halogen atom or a group $-SO_3^-$ or $-COO^-$, Z stands for an anion and $n$ is 0 or 1, $n$ being 0 if X is one of the above-mentioned anions and $n$ is 1 if X stands for a hydrogen or halogen atom.

This invention furthermore provides a simple and extremely economic process for the preparation of these compositions, which comprises dissolving dyestuff salts of the above-mentioned formula (1), optionally with the addition of at least the stoichiometrical amount of an alkali metal or alkaline earth metal hydroxide or carbonate or an aqueous solution of these alkalis, in an organic solvent miscible at any ratio with water on in an aromatic amine which is liquid below 50° C, dissolving in this solution such a resin which can be precipitated again with the addition of aqueous acids, or adding a solution of such a resin in one of the said solvents, mixing the mixture thus obtained with an aqueous solution of an acid at temperatures between about $-10°$ C and $+50°$ C and recovering the pigment compositions that have precipitated.

The dyestuffs of the above-mentioned general formula, used for the composition, may be prepared, for example, by converting the fluorescein derivatives obtainable by reaction of resorcinol or resorcinol ethers with aromatic carboxylic acids or the functional derivatives thereof (for example benzotrihalides, anhydrides or acid halides) by means of chlorination agents, for example phosphoroxy chloride, into the corresponding dichloro-xanthene derivatives and reacting these, optionally in the presence of acidic catalysts (for example $ZnCl_2$, $AlCl_3$, $FeCl_3$, $SnCl_4$), with correspondingly substituted aromatic amino compounds, working up the dyestuff melt by pouring it into an aqueous acid, suction-filtering the precipitated dyestuff and drying it after washing until neutral or advantageously using it as a moist filter cake for the composition.

The term "resins" is to refer to natural resins, for example balsam rosin, root or tall resin, the oxidation products thereof formed by storage in the air and mixtures thereof, as well as to synthetic resins, for example hydrocarbon resins.

The term "modification products" comprises known derivatives of the above-mentioned compounds that have already been disclosed in the art (for example, W. Sandermann, "Naturharze, Terpentinol, Tallol"), for example :

1. Oxidized resinic acids,
2. Hydrogenated resinic acids (cf. U.S. Pat. No. 2,174,651 ),
3. Dimerized resinic acids (cf. German patent No. 564 897 and U.S. Pat. No. 2,124,675 ),
4. Disproportionated resinic acids,
5. Acid resin esters with mono-, di- and/or polyhydric alcohols or mixtures thereof or products obtainable by reaction of resinic acids with epoxy resins or ethylene oxide (cf. W. Sandermann, l.c., page 217),
6. Aldehyde-modified resins obtained by addition reaction of, for example, formaldehyde or other suitable aldehydes with resins (cf. German patent No. 742 209) or further condensation products of the aldehyde-modified resins with phenols or formaldehyde and phenols (cf. U.S. Pat. Nos. 1,658,828 and No. 2,007,983) as well as reaction products obtained by oxonation or hydroformylation of resins (cf. U.S. Pat. No. 2,327,066),
7. Acid maleinate resins and other products obtainable by reaction of dienes with resins, as disclosed, for example, by Sandermann, (l.c., page 240), for example levopimaric acid-maleic acid anhydride adducts, maleic or fumaric acid adducts on resins or resins or resin esters prepared from acrylic acid, 8. Phenol-modified resins that are obtained under the action of strongly acid or acid-splitting catalysts by addition reaction of phenols with resins and are distinguished by a possible content of free acid groups and phenolic hydroxy groups which may be esterified (partially) (cf. German patents No. 581 596, 582 846, 652 602 and 536 170, French patent No. 923 602), 9. Resin adducts with hydrocarbons containing double bonds, that have been obtained in the presence of strongly acid compounds, such as boron trifluoride. Such hydrocarbons are, for example, butadiene, isobutene, isoprene, cyclopentadiene, styrene, methyl- and Vinyl-styrene, indene and carbazole (cf. U.S. Pat. Nos. 2,527,577, 2,527,578 and 2,532,120 , German patent No. 578 039 and French patent No. 958 920), 10. Resin-modified acid phenol resins prepared by reaction of resins with phenol-aldehyde, preferably phenol-, alkylphenol- or arylalkylphenol-formaldehyde condensation products or mixtures thereof. The phenol-formaldehyde condensation products may have been prepared under the action of alkaline condensation agents, preferably having more than 1 mol of aldehyde per mol of phenol, as well as under the action of acid catalysts having less or more than 1 mol of formaldehyde. It is also possible to have the resins condensed together with phenols, aldehydes and condensation agents (cf. German patents No. 254 411, No. 269 959 and No. 281 939), 11. Acid resin condensation products with xylene-formaldehyde resins (cf. German Patent No. 815 544), 12. Resin condensation products with terpene-maleic resins, known for example under the trade name Pertrex (cf. E.R. Littmann, Ind. Engng. Chem. 28, 1150 (1936).

The pigment compositions of the invention may be prepared according to two different methods:

I. The xanthene dyestuffs of the general formula I are dissolved in an organic solvent miscible with water at any ratio. In the case of dyestuffs having $X = COO^-$ or $SO_3^-$ (viol-amines, sulfoviol-amines), an at least stoichiometrical amount of alkali, preferably sodium hydroxide solution, potassium hydroxide solution or alkali metal carbonate, has moreover to be added since the free acids or inner dyestuff salts

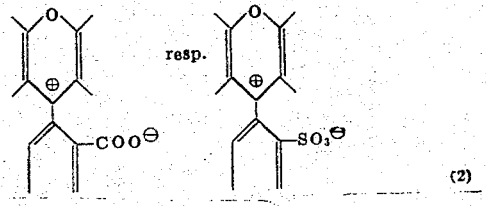

(2)

are insoluble as such.

This solution is then combined with a resin solution using as the resin solvent, preferably but not necessarily, the same organic liquids as for the dyestuffs.

The solvents used are aliphatic substances containing hydroxy groups, for example mono- and polyhydric alcohols or mono-esters of polyhydric alcohols, lower ketones, cyclic ethers or nitrogen-containing water-soluble aliphatic substances, such as nitriles or amides or short-chain carboxylic acids or nitro-alkanes or amides of phosphoric acid. Methanol, ethanol, isopropanol, monomethyl-glycol, ethyl-diglycol, acetone, methyl-ethyl-ketone, dioxan, tetrahydrofuran, acetonitrile, diamethylformamide, nitromethane and hexamethyl-phosphoric amide have proved especially advantageous.

The dyestuffs or resins are dissolved at a temperature between 0° and 150°C, preferably between 20° and 100°C. The combined solutions are also stable at room temperature.

They are precipitated while stirring, optionally while whirling, in an aqueous acid, preferably a mineral acid such as hydrochloric acid, dilute sulfuric or phosphoric acid (of 5 to about 40 percent strength) or in aqueous solutions of organic water-soluble carboxylic acids, such as formic acid, acetic acid, monochloroacetic acid, dichloroacetic acid and trichloroacetic acid, at a temperature of from −10° to +50°C, advantageously from 0° to +20°C. The prepared pigment precipitates in a finey divided form and can easily be suction-filtered. The dyestuff is suction-filtered, washed until neutral and dried in vacuo at temperatures of from 40° to 150°C, preferably from 50° to 100°C.

The acid used should advantageously correspond, in the case of the dyestuffs of the above general formula (I) in which $n$ is 1, to the acid used for the synthesis. If, however, the dyestuffs are present in the form of their inner salts ($n = 0$), any acid may be chosen since in this case the inner dyestuff salt precipitates at any event in a prepared form. The acid amount may vary within wide limits; it is, however, suitable to use amounts of from at least 1 to about 2.5 equivalents of acid per mol of dyestuff or alkali.

II. The dyestuffs of the general formula I are dissolved in an organic amine with the addition of at least the stoichiometrical amount of alkali, preferably sodium hydroxide solution, potassium hydroxide solution or alkali metal carbonate, optionally using aqueous solutions of these substances. This reaction yields the amine- soluble carbinols (3) of the dyestuffs 1:

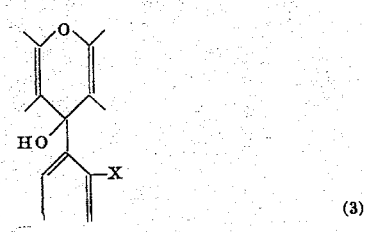

(3)

In case of some dyestuffs, the dyestuff salts (I) are also soluble in these solvents and they need not be converted into the carbinols. What conditions are advantageous for a determined dyestuff can be decided upon by simple laboratory tests.

The amines used according to the invention are aniline, toluidines, xylidines, halogeno-anilines and halogeno-xylidines, aminophenol ether, naphthyl-amines or amino-heterocycles, as far as they are liquid at 50°C, as well as basic heterocycles, such as pyridine, the picolines and lutidines, preferably aniline, o- and m-toluidine, vic. m-xylidine, 3-chloro-aniline, 6-chloroo-toluidine, 5,6-dichloro-2-amino-toluene, α- and β-naphthylamines, pyridine and α-picoline.

It is especially advantageous to use the amine employed in the dyestuff synthesis for the halogen exchange, since the preparation can then be carried out without working up and intermediate isolation of the dyestuffs, which means at any event a simplification of the process and thus economic advantages.

The amine solution of the dyestuffs obtained is combined, optionally after separation of the aqueous-alkaline phase, with an amine solution of the resin, the amines used for the disolution of the resin being advantageously the same for reasons of working up.

The combined solutions which are also stable at room temperature are then precipitated as disclosed for method I, in an excess aqueous acid, the precipitate is suction-filtered, washed and dried. By "excess acid" there is understood such an equivalent amount of acid as to ensure conversion of the dyestuff and of the amine used as a solvent into the corresponding salts, whereupon the prepared dyestuff salt precipitates, whereas the amine salt remains in solution and is separated by filtration.

The quantity ratio of dyestuff to resin chosen is suitably such that a sufficiently fine division is ensured in addition to an optimum tinctorial strength of the composition. This varies from dyestuff to dyestuff and is generally between 10 and 70 percent, preferably between about 25 to 50 percent of resin, calculated on the weight of the dry pigment composition.

The pigments obtainable according to the invention are distinguished by an extraordinary good brilliance of the prints produced therewith. They are extremely easy to disperse in printing varnishes and therefore especially valuable in use. Owing to their high brilliance they are not only used for preparing printing inks but also for the shading of the pigments hitherto used for this purpose since they substantially increase the brightness thereof. Since they also offer economic advantages due to an excellent tinctorial strength which, from a merely theoretical point of view, cannot be achieved using the comparative dyestuffs because of the specifically very heavy precipitating reagents (the inorganic colorless heteropoly acid portion is about 70 percent in a stoichiometric composition), these products make a valuable contribution to the class of printing dyestuffs and represent a substantial technical advance.

The following Examples serve to illustrate the invention, the parts and percentages being by weight unless stated otherwise.

EXAMPLE 1

Sixty-five Parts of a dyestuff of the formula

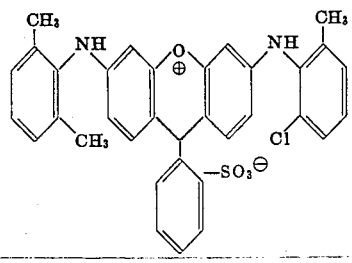

prepared by reaction of 3,6-dichloro-9-phenyl-xanthydrylium-2'-sulfonate obtainable according to Example 2 of German patent No. 848 231 with 1 mol of 6-chloro-o-toluidine in methanol and subsequent melting of the intermediate obtained with excess vic. m-xylidine, were dissolved in 200 parts of ethanol while adding 5 parts of sodium hydroxide solution at 70°–80°C, a solution of 35 parts of balsam rosin in twice the amount of ethanol was added and the whole was cooled to room temperature. The mixture was introduced while vigorously stirring at 0°C into a solution of 10 parts of concentrated sulfuric acid in 1000 parts of water, stirring was continued for 5 minutes at 0°C, the precipitate was suction-filtered, washed with water until neutral and dried in vacuo at 45°– 50°C. 98 – 100 parts of a red dyestuff powder were obtained, which can easily be dispersed in printing varnishes and provides excellently color-intense and brilliant prints.

When acetone was used instead of ethanol and a dimerized natural resinic acid instead of balsam rosin, a printing pigment having comparable properties was obtained.

EXAMPLE 2

Eighty Parts of a dyestuff of the formula

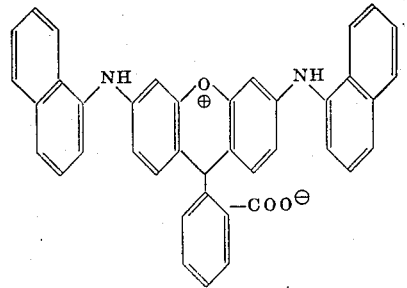

prepared from the chlorination product obtained by reaction of fluorescein with phosphoroxy chloride, and α-naphthylamine in the presence of zinc chloride, were dissolved at 100°C with addition of 9 parts of potassium carbonate in 250 parts of monomethyl-glycol. A solution of 20 parts of a weakly polar synthetic hydrocarbon resin in 100 parts of monomethyl glycol was added to the cooled solution and the mixture was precipitated at 20°C while vigorously stirring in 1,000 parts of 5 percent hydrochloric acid. Stirring was continued for a short time, the precipitate was suction-filtered and dried in vacuo at 80° – 90°C after washing. 100 Parts of a red violet dyestuff powder were obtained, which can very easily be incorporated in printing inks and provides very brilliant and intense dyeings.

When a dyestuff obtained from the same intermediate with o-toluidine was used instead of the above-mentioned dyestuff while operating in the same manner as indicated, 100 parts of a violet dyestuff powder having similar properties in use were obtained.

EXAMPLE 3

Fifty Parts of a dyestuff of the formula

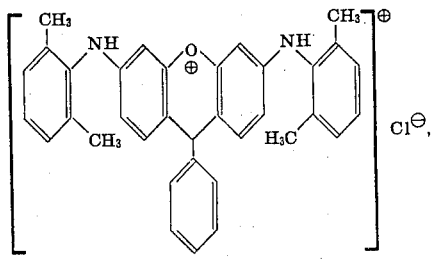

prepared from the reaction product of benzotrichloride with resorcinol (3,6-dihydroxy-9-phenyl-xanthydrylium chloride) by chlorination with phosphoroxy chloride and subsequent condensation with vic. m-xylidine in the presence of zinc chloride, were dissolved at room temperature in the form of a moist filter cake in 250 parts of acetonitrile. 100 Parts of a 50 percent methanolic solution of oxidized, hydrogenated, dimerized or disproportionated resinic acid or of a mixture of these compounds were added and then the mixed solution obtained was precipitated in 500 parts of 5 percent hydrochloric acid at 10°C, stirring was continued for 20 minutes and after filtration and washing until neutral the precipitate was dried in vacuo at 50°C. 97 – 99 Parts of a dyestuff composition were obtained, which can very easily be dispersed in printing varnishes and provides bright bluish red prints having a high color intensity.

Instead of acetonitrile, dioxan or dimethylformamide could be used with the same good success.

EXAMPLE 4

Seventy-five Parts of a dyestuff of the formula

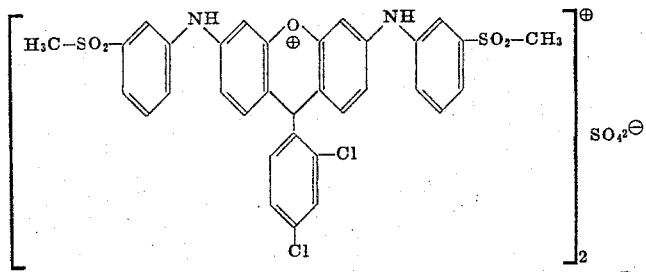

prepared by melting 3,6-dimethoxy-9-(2',4'-dichlorophenyl)-xanthydrol obtained from resorcinol monomethyl ether and 2,4-dichlorobenzotrichloride, with 3-methylsulfonyl-aniline in the presence of aluminum chloride and by precipitating the dyestuff melt in dilute sulfuric acid, were dissolved at 80°C in 400 parts of dimethylformamide together with 25 parts of an acid natural resinic acid partially esterified with glycerol and pentaerythritol. The cooled dyestuff-resin solution was precipitated in 2,500 parts of 2.5 percent aqueous sulfuric acid at room temperature, while vigorously stirring, and the precipitate was suction-filtered, washed until free from solvents and acids and dried in vacuo at 60° – 70°C. 95 – 97 Parts of a reddish blue dyestuff powder were obtained, which can excellently be incorporated in printing inks and provides brilliant intense prints.

When in the dyestuff melt 4-anisidine was used instead of 3-methylsulfonyl-aniline, a blue pigment having similar printing properties was obtained.

The preparation of the above-used resin was brought about in the following manner:

1,000 Parts of balsam rosin, 14 parts of glycerol and 16 parts of pentaerythritol were stirred for 1 hour at 200°, while carbonic acid was passed over the mixture, and then the whole was heated to 250°C for 2 hours. Subsequently, 0.5 part of calcium acetate was added, the mixture was maintained at 260°C for 3 hours and then allowed to cool. A resin having a melting point of 73°C and an acid number of 111 was obtained. Corresponding results were obtained using, as a preparation agent, a resin that had been prepared in the following manner: 200 Parts of styrene were added to 1000 parts of molten balsam rosin, 10 parts of boron trifluoride-dimethyl etherate were added dropwise while stirring at 120°C within 1 hour, stirring was continued for 2 hours and the temperature was then raised to 135°C within 1 hour. Heating was continued under slightly reduced pressure at 200°C and then under a pressure of 30 – 50 torr for 1 hour at 250°C. 1,115 Parts of a resin having a melting point of 65°C and an acid number of 100 were obtained.

EXAMPLE 5

Seventy Parts of a dyestuff of the formula

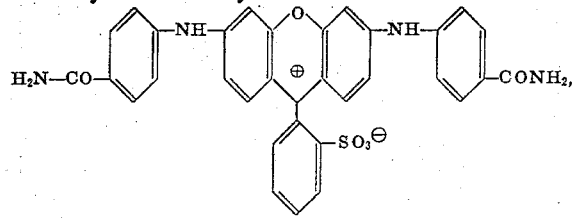

prepared by reaction of the intermediate (3,6-dichloro-9-phenyl-xanthydrylium-2'-sulfonate), obtainable according to German Patent No. 848 231, Example 2, with 4-amino-benzamide, were suspended together with 30 parts of an aldehyde-modified resinic acid (obtained by addition reaction of 14.4 parts of 96 percent paraformaldehyde with 272 parts of balsam rosin at 120°C, m.p. 81°C, acid number 125) and 10 g of sodium carbonate in 280 parts of phosphoric acid-trisdimethylamide. Upon stirring for 2 hours at 70°C, complete dissolution was obtained. The solution was cooled to 20°C and precipitated by adding it dropwise to 1,500 parts of 5 percent hydrochloric acid cooled to 5°C, stirring was continued for 20 minutes, the precipitate was suction-filtered, washed until neutral and dried in vacuo at 60°– 70°C. 100 Parts of a reddish blue pigment powder was obtained, which is easily dispersible and provides especially brilliant printing inks of high tinctorial strength. When a corresponding dyestuff was used, in which 4-amino-benzamide was replaced by 3-nitroaniline, a blue-violet pigment powder having comparable properties of use was obtained.

EXAMPLE 6

A dyestuff melt prepared from 39 parts of 3,6dichloro-9-phenyl-xanthydrylium-2'-sulfonate (cf. German patent No. 848 231, Example 2) and 200 parts of 2,6-diethylaniline contained, after complete reaction, 50 parts of a dyestuff of the formula

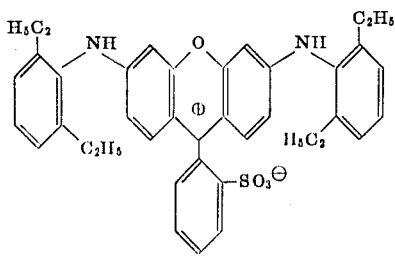

which was suspended in a solution of 2,6-diethylaniline hydrochloride in an excess base. 150 Parts of 30 percent sodium hydroxide solution were then added and the whole was stirred for 2 hours at 100° – 110°C. The dyestuff entered quantitatively into solution in the amine phase as a carbinol. The (lower) aqueous phase was separated, the 2,6-diethylaniline phase was combined with 50 parts of a weakly polar hydrocarbon resin and the mixture was stirred until this resin was completely dissolved (30–45 minutes). The solution was cooled to 0°C, precipitated in 10 percent phosphoric acid, cooled to 0°C (1,500 parts), and the precipitated pigment was suction-filtered. After having been washed until neutral it was dried in vacuo at 50°C until a constant weight was obtained. 96 – 99 Parts of bluish red pigment powder were obtained, which can especially easily be dispersed in printing inks and provides intense bright prints.

When corresponding amounts of vic. m-xylidine were used instead of 2,6-diethyl-aniline, a pigment having a similar shade and the same good properties was obtained.

EXAMPLE 7

Sixty-five Parts of a dyestuff of the formula

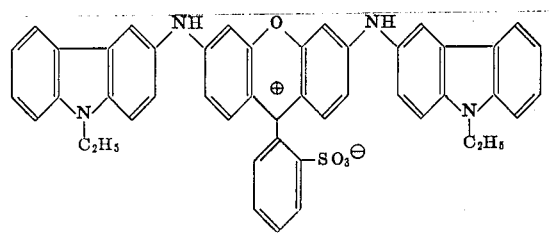

obtained by reaction of 3,6-dichloro-9-phenyl-xanthydryl-2'-sulfonate mentioned in German patent No. 848 231, Example 2, with 3-amino-N-ethyl-carbazole were suspended in 300 parts of aniline. After addition of 200 parts of 25 percent potassium hydroxide solution, the mixture was stirred for 1 hour at 90°–95°C, whereupon the dyestuff dissolved in aniline in the form of carbinol. The aniline solution was separated in a separating funnel, 140 parts of a 25 percent solution of an acid acrylic resin in aniline were added and the whole was cooled to room temperature. The combined aniline solutions were then added dropwise, within 30 minutes, to 1,250 parts of 27.5 percent sulfuric acid while the temperature was not allowed to exceed 20°C. Stirring was continued for 45 minutes, the precipitate was suction-filtered, washed until free from salt and dried in vacuo at 100° – 110°C. 100 Parts of a brillant red-violet pigment having a high tinctorial strength and excellent properties of use were obtained.

When 3-amino-diphenyl ether was used instead of 3-amino-N-ethyl-carbazole and m-toluidine instead of aniline, a similar pigment was obtained.

The acid acrylic resin used was prepared by reaction of 1,000 parts of tall resin with 150 parts of acrylic acid at 200°C. After 150minutes, the mixture was esterified with 80 percent glycerol for 3 hours at 250°C. After the usual work-up, about 1,140 parts of acid acrylic resin (m.p. 118°C, acid number 103) were obtained.

EXAMPLE 8

Sixty Parts of a dyestuff of the formula

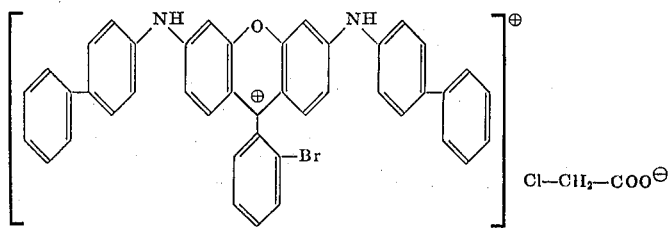

were dissolved in 120 parts of o-toluidine at 50°C. A solution of 40 parts of a resin-modified acid phenol resin in 120 parts of o-toluidine was added, the mixed solution was precipitated by adding it dropwise to 2,000 parts of 25 percent aqueous monochloroacetic acid while stirring at +10°C, the precipitate was washed until neutral after suction-filtration and dried in vacuo at 40° – 50°C. 93 – 96 Parts of a violet pigment were obtained, which is excellently suitable for the production of brilliant violet printing inks having an extraordinary tinctorial strength.

The dyestuff was prepared in the following manner: 110 Parts of resorcinol and 105 parts of 2-bromo-benzotrichloride were heated to 115°C for 2 hours in 300 parts of chlorobenzene, 154 parts of phosphoroxy chloride were then added dropwise within further 30 minutes and stirring was continued for another 2 hours at 115°C. After addition of 450 parts of 4-aminodiphenyl and 70 parts of zinc chloride, condensation was effected for 30 hours at 180°C, the mixture was then cooled to 100°C, 400 parts of 30 percent sodium hydroxide solution and 250 parts of chlorobenzene were added, and stirring was continued for 2 hours at 100°C. The carbinol of the above dyestuff precipitated, it was suction-siltered, washed with chlorobenzene and subsequently dissolved in 200 parts of 80 percent aqueous monochloro-acetic acid. After decomposition of this solution by means of water, the precipitate was suction-filtered, washed until neutral, and after drying 162 parts of a pure dyestuff were obtained.

The resinic acid-phenol adducts used were prepared in the following manner:

1,000 Parts of balsam rosin were melted, 100 parts of phenol and 100 parts of xylene were added and 7 parts of boron trifluoridedimethyl etherate were added to the melt at 100°C. The melt was heated to 120°C for 2 hours, the temperature was then raised to 140°C and condensation was continued for further 2 hours. 300 Parts of xylene, 150 parts of a saturated sodium carbonate solution were then added, the aqueous phase was separated at 95°C and the xylene phase was distilled at a temperature of up to 200°C. The residue was the phenol resin (1000 parts, m.p. 100°C, acid number 126).

This resin can be used as such for the pigment composition or may preliminarily be modified with resin. For this purpose, it was added to natural resinic acids heated to 100° –180°C and was condensed for several hours at this temperature.

The natural resinic acids may also be condensed together with phenols, aldehydes and catalysts (cf. German patent No. 254 411, No. 269 959 and No. 281 939).

EXAMPLE 9

Eighty-five Parts of a dyestuff of the formula

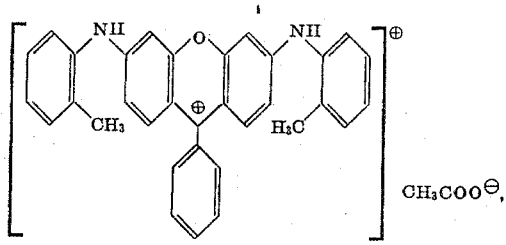

obtained by reaction of 3,6-dichloro-9-phenyl-xanthydrol disclosed in Example 3 with o-toluidine in the presence of zinc chloride, subsequent alkaline decomposition of the dyestuff melt and dissolution and precipitation of the carbinol from 80 percent aqueous acetic acid (cf. Example 8), were dissolved together with 15 parts of dimerized rosin in 200 parts of pyridine, the solution was cooled to −10°C and then added drop-wise while vigorously stirring at −10° to 0°C, within 2 hours, to 2,500 parts of 20 percent aqueous acetic acid. The precipitated pigment was suction-filtered, washed until neutral and dried in vacuo at 60° –70°C. 96 – 97 Parts of a dyestuff powder were obtained, which can be excellently dispersed in printing inks and provides very bright intense red-violet prints.

When α-picoline was used instead of pyridine, the dyestuff was obtained with the same yield.

A composition having similar properties was obtained using for the synthesis of the dyestuff the same amount of N-methylaniline instead of o-toluidine.

EXAMPLE 10

Sixty-five Parts of dyestuff of the formula

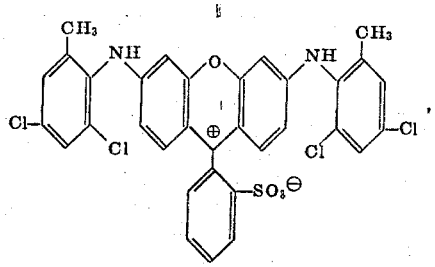

obtained by melting 3,6-dichloro-9-phenyl-xanthydryl-2'-sulfonate (cf. German patent No. 848, 231, Example 2) with 3,5-dichloro-2-amino-toluene, were suspended in 150 parts of 3-chloroaniline. After addition of 150 parts of 40 percent potassium hydroxide solution the mixture was heated to 110°C. The dyestuff dissolved in the form of the carbinol in the chloroaniline. The (lower) aqueous phase was separated, the organic phase was combined with a solution of 35 parts of a resin-modified phenol resin, as disclosed in Example 8, in 70 parts of aniline, the mixture was cooled to 20°C and the mixed solution was precipitated while stirring in 1,500 parts of 40 percent surfuric acid of 20°C.

The precipitated pigment was suction-filtered, washed and dried in vacuo at 80° – 90°C. 100 Parts of a pigment powder were obtained. It can easily be incorporated by dispersion in printing varnishes and provides bright yellowish red printing inks having a high tinctorial strength.

When 5,6-dichloro-2-amino-toluene was used as a melting component instead of 3,5-dichloro-2-amino-toluene, red violet printing inks having similar properties were obtained.

A composition having similar properties was obtained using for the synthesis of the dyestuff the same amount of N-methylaniline instead of the dichloro o-toluidine.

We claim:

1. A process for the manufacture of pigment compositions made from resins and xanthene dyestuff salts of the general formula

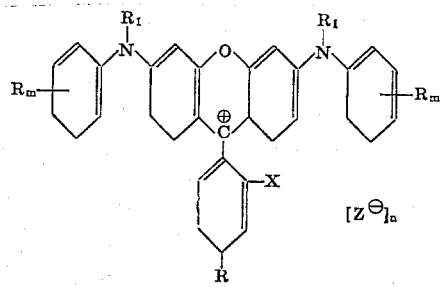

(1)

in which

R stands for hydrogen, halogen, alkyl, alkoxy, nitro, nitrilo, carboxylic acid ester, carbonamido, alkylsulfonyl, acylamino, sulfamido, amino, alkylamino, phenylamino, or phenyl and two of the radicals R in ortho position may together stand for a condensed phenyl ring or heterocyclic ring, $R_1$ stands for hydrogen, methyl or ethyl, $m$ is 0 or an integer of 1 to 3, X stands for hydrogen, halogen, $-SO_3^-$ or $-COO^-$, z stands for an anion and $n$ is 0 or 1, $n$ being 0 if X stands for one of the above-mentioned anions and $n$ being 1 if X stands for a hydrogen or halogen atom, which process comprises preparing a solution of dyestuff salts of the above-mentioned general formula (1) and an acid-precipitatable resin in a solvent selected from organic solvents miscible with water at any ratio and aromatic amines which are liquid below 50°C, mixing the solution thus obtained with an aqueous solution of an acid at temperatures between about −10° and +50°C. and recovering the precipitated pigment-resin composition.

2. The process of claim 1, wherein as resins natural resinic acids, the oxidized, hydrogenated, dimerized or disproportionated derivatives thereof or synthetic resins, acid resin esters, aldehyde-modified resins, maleinate resins and other compounds obtainable by the reaction of dienes with resins, phenyl-modified resins, addition products of resins with hydrocarbons containing double bonds, condensation products of resins and phenol-(form)-aldehyde condensation products, resin condensation products with xylene-formaldehyde resins, reaction products of resins and terpene-maleinate resins or mixtures of these resins are used.

3. A process according to claim 1 wherein an organic solvent miscible with water is used and the dyestuff is solubilized by addition of an alkali metal or alkaline earth metal hydroxide or carbonate.

4. A pigment composition of a resin and an xanthene dyestuff made by the process of claim 1.

5. A pigment composition of a resin and an xanthene dyestuff made by the process of claim 1.

* * * * *